US012697855B2

(12) United States Patent
Borchert

(10) Patent No.: US 12,697,855 B2
(45) Date of Patent: Aug. 4, 2026

(54) METHOD AND APPARATUS FOR DETECTING THE OPERATION OF AN ENGINE-INDEPENDENT AUXILIARY HEATER AND FOR DIAGNOSING A COOLANT TEMPERATURE OF A MOTOR VEHICLE

(71) Applicant: Volkswagen Aktiengesellschaft, Wolfsburg (DE)

(72) Inventor: Tristan Borchert, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 382 days.

(21) Appl. No.: 18/542,749

(22) Filed: Dec. 17, 2023

(65) Prior Publication Data
US 2024/0208297 A1 Jun. 27, 2024

(30) Foreign Application Priority Data
Dec. 23, 2022 (DE) ..................... 10 2022 214 357.4

(51) Int. Cl.
*B60H 1/00* (2006.01)
*B60H 1/03* (2006.01)
(Continued)

(52) U.S. Cl.
CPC ..... *B60H 1/00885* (2013.01); *B60H 1/00778* (2013.01); *B60H 1/03* (2013.01);
(Continued)

(58) Field of Classification Search
CPC .. B60H 1/00885; B60H 1/00778; B60H 1/03; B60H 1/034; B60H 2001/00307;
(Continued)

(56) References Cited

U.S. PATENT DOCUMENTS 5,063,513 A * 11/1991 Shank .................. B60H 1/2206
219/205
6,931,865 B1 8/2005 Van Gilder et al.
(Continued)

FOREIGN PATENT DOCUMENTS

DE 4426494 A1 2/1996
DE 102005003251 B4 11/2008
(Continued)

*Primary Examiner* — Grant Moubry
(74) *Attorney, Agent, or Firm* — Muncy, Geissler, Olds & Lowe, P.C.

(57) ABSTRACT
A method and apparatus for detecting the operation of an engine-independent auxiliary heater in a cooling system with multiple coolant circuits in a vehicle system with an auxiliary heater. On or after activating the vehicle system for a cold start, a shut-off valve is opened between a first coolant circuit with the auxiliary heater and a second coolant circuit with the coolant temperature sensor. A coolant pump is activated so that coolant from the first coolant circuit flushes around the coolant temperature sensor. A time course of a temperature reading from the coolant temperature sensor is performed for a predetermined period of time from the time the vehicle system is activated. A gradient of the temperature reading curve is determined. The gradient of the temperature reading curve is evaluated using a threshold value comparison to determine whether the auxiliary heater was activated before the cold start.

7 Claims, 3 Drawing Sheets

(51) Int. Cl.

| | |
|---|---|
| *B60K 11/02* | (2006.01) |
| *F01P 11/16* | (2006.01) |
| *F01P 11/20* | (2006.01) |
| *F02D 41/22* | (2006.01) |
| *F02N 19/10* | (2010.01) |
| *F01P 7/14* | (2006.01) |
| *F01P 7/16* | (2006.01) |
| *F02D 41/06* | (2006.01) |

(52) U.S. Cl.

CPC .............. *B60H 1/034* (2013.01); *B60K 11/02* (2013.01); *F01P 11/16* (2013.01); *F01P 11/20* (2013.01); *F02D 41/222* (2013.01); *F02N 19/10* (2013.01); *B60H 2001/00307* (2013.01); *B60H 2001/00928* (2013.01); *F01P 2007/146* (2013.01); *F01P 7/162* (2013.01); *F01P 2025/32* (2013.01); *F01P 2037/02* (2013.01); *F01P 2060/08* (2013.01); *F01P 2060/18* (2013.01); *F02D 41/064* (2013.01); *F02D 2200/021* (2013.01)

(58) Field of Classification Search

CPC .......... B60H 2001/00928; B60K 11/02; B60R 16/023; F01P 11/16; F01P 11/20; F01P 7/162; F01P 2007/146; F01P 2025/32; F01P 2037/02; F01P 2060/08; F01P 2060/18; F02D 41/222; F02D 41/064; F02D 2200/021; F02N 19/10; G01K 15/007; G01M 17/007

See application file for complete search history.

(56) References Cited

U.S. PATENT DOCUMENTS

| | | | |
|---|---|---|---|
| 8,538,623 B2 | 9/2013 | Eser et al. | |
| 10,731,543 B2* | 8/2020 | Maiello | F01P 11/14 |
| 11,041,453 B2 | 6/2021 | Kirsch et al. | |
| 2009/0319162 A1* | 12/2009 | Bommer | F02D 41/222 |
| | | | 701/113 |
| 2012/0103283 A1* | 5/2012 | Mehring | F01P 3/02 |
| | | | 165/41 |
| 2012/0245830 A1 | 9/2012 | Eser et al. | |

FOREIGN PATENT DOCUMENTS

| | | | |
|---|---|---|---|
| DE | 102007045370 A1 | 4/2009 |
| DE | 102009058514 B3 | 4/2011 |
| DE | 102009057586 A1 | 6/2011 |
| DE | 102011088409 B3 | 3/2013 |
| DE | 102016118672 B3 | 10/2017 |

* cited by examiner

METHOD AND APPARATUS FOR DETECTING THE OPERATION OF AN ENGINE-INDEPENDENT AUXILIARY HEATER AND FOR DIAGNOSING A COOLANT TEMPERATURE OF A MOTOR VEHICLE

This nonprovisional application claims priority under 35 U.S.C. § 119(a) to German Patent Application No. 10 2022 214 357.4, which was filed in Germany on Dec. 23, 2022, and which is herein incorporated by reference.

BACKGROUND OF THE INVENTION

Field of the Invention

The invention relates to a method for detecting an operation of an engine-independent auxiliary heater in a coolant system of a vehicle in order to avoid misdiagnosis of a coolant temperature sensor during cold start.

Description of the Background Art

The coolant system of a motor vehicle is used to transport heat between heat-emitting components, such as an engine, and heat-absorbing components, such as the radiator, the interior heater and the like. The coolant system is formed with a coolant circulating in a piping system between the components of the coolant system.

At low outside temperatures, the coolant system is also used to supply waste heat from the engine to the interior heating system. If an auxiliary heater independent of engine operation is provided, it is connected to the coolant system so that it is possible to heat the vehicle interior via the interior heating system.

Knowledge of the coolant temperature is necessary during the operation of the combustion engine for optimal control in order to avoid increased pollutant emissions or damage to the combustion engine.

Therefore, it is necessary to carry out a regular check of the functionality of the coolant temperature sensor. For example, conventional monitoring can provide for detecting the temperature reading of the coolant temperature sensor during a cold start of the combustion engine and comparing it with the ambient temperature, among other things. However, if there is an auxiliary heater in the vehicle that is independent of engine operation and is connected to the coolant system, this check will result in false positives if the auxiliary heater was previously active when the vehicle was deactivated.

Document DE 10 2009 058 514 B3, which corresponds to US 2012/0245830, discloses a method for monitoring a coolant temperature sensor and/or a cylinder head temperature sensor of a motor vehicle, wherein when an internal combustion engine of a motor vehicle is started, an actual value of the coolant temperature is determined by the coolant temperature sensor and an actual value of the cylinder head temperature is determined by a cylinder head temperature sensor, wherein the coolant temperature sensor and/or the cylinder head temperature sensor is diagnosed as a functioning sensor in the event of an equal upward deviation between the actual values of the coolant temperature and the cylinder head temperature in relation to an outside temperature and/or an intake air temperature.

Document DE 10 2005 003 251 B4, which corresponds to US 2005/0178130, discloses a method for testing an engine coolant temperature sensor in a vehicle with a processor, with the following steps: Receiving an MCT measurement data value from the engine coolant temperature sensor and an intake air temperature measurement data value; Evaluating the temperature difference between the MKT measurement data value and the intake air temperature measurement data value to determine if irrationality exists, wherein the evaluation step includes monitoring the intake air temperature measurement data value during the operation of the vehicle to detect the presence of engine block heating in case the temperature difference exceeds a predetermined threshold; and providing an indication of rationality in response to the evaluation step.

Document DE 10 2011 088 409 B3 discloses a method for monitoring a temperature sensor for a coolant of an internal combustion engine, with the following steps: Sensing the coolant temperature by means of the temperature sensor, Determining an upper reference temperature based on the ambient temperature of the internal combustion engine, Determining that the coolant temperature is above the upper reference temperature, Detecting an unsuccessful first attempt to start the internal combustion engine under first operating parameters corresponding to the coolant temperature, Detecting a successful second attempt to start the internal combustion engine under second operating parameters corresponding to a replacement temperature that is less than the coolant temperature, and Determining that the temperature sensor is defective.

Document DE 10 2009 057 586 A1, which corresponds to US 2012/0330496, discloses a method for monitoring a coolant temperature sensor of a motor vehicle, wherein an actual value of a coolant temperature is determined by a coolant temperature sensor when an internal combustion engine of the motor vehicle is started, and the coolant temperature sensor is diagnosed as a functional coolant temperature sensor in the event of a short-term drop in the actual value of the coolant temperature following the start of the combustion engine.

Document DE 10 2007 045 370 A1 discloses a method for determining the performance of a cooling system of a motor vehicle with a retarder as a function of a temperature of a coolant, wherein a temperature gradient of the coolant is determined immediately after braking of the retarder, wherein the performance of the cooling system is determined depending on the size of the temperature gradient.

Document DE 44 26 494 A1 discloses an apparatus for monitoring the cooling system of an internal combustion engine, with a temperature sensor which generates a temperature signal characteristic of the cooling system and with an evaluation device which evaluates the temperature signal and, if a fault is detected, triggers a display, wherein the course of the temperature signal is evaluated and detected temperature changes per unit of time are compared with plausible values.

By coupling the coolant system with the auxiliary heater in a motor vehicle, heat can be introduced into a coolant circuit before the engine system starts, which circuit also contains a temperature sensor relevant to engine operation. As a result, the coolant temperature sensor is flushed with coolant at a significantly higher temperature than the ambient temperature. Since the previous operation of the auxiliary heater in a motor vehicle is not signaled separately in every case, the diagnostics function does not initially provide any information as to whether a temperature difference determined in accordance with the above procedure is caused by a malfunction of the coolant temperature sensor or by the operation of the auxiliary heater.

SUMMARY OF THE INVENTION

It is therefore an object of the present invention to provide a method and an apparatus for detecting the operation of a coolant temperature sensor in a coolant system with multiple coolant circuits in a vehicle system with an auxiliary heater by means of which it can be determined that an auxiliary heater is in operation before an engine start.

This object is achieved by a method of determining the operation of an engine-independent auxiliary heater prior to engine start-up and of diagnosing a coolant temperature sensor in a coolant system with multiple coolant circuits and by a corresponding apparatus and a diagnostics function.

According to a first aspect, a method for detecting the operation of an engine-independent auxiliary heater in a coolant system with multiple coolant circuits in a vehicle system is with the following steps: on or after activating the vehicle system for a cold start, opening a shut-off valve between a first coolant circuit with the auxiliary heater and a second coolant circuit with a coolant temperature sensor, and activating a coolant pump so that coolant in the first coolant circuit flushes around the coolant temperature sensor; recording a temperature reading of the coolant temperature sensor over time for a predetermined period of time from the moment the vehicle system is activated; determining a gradient of the course of the temperature reading; and evaluating the gradient of the course of the temperature reading using a threshold value comparison to determine whether the auxiliary heater was activated before the cold start.

Furthermore, the threshold value comparison can be carried out depending on an integration value of the gradient of the course of the temperature reading.

Alternatively, the threshold value comparison can be carried out depending on an integration value of an amount of the gradient of the course of the temperature reading.

It can be determined that the auxiliary heater was activated before the cold start if the integration value exceeds a predetermined threshold value.

The above method refers to a vehicle system with a coolant system for the transport of heat between components in the vehicle system, such as a radiator for cooling an internal combustion engine, an interior heater for heating a vehicle interior, and an auxiliary heater designed to supply thermal energy to the interior heating system via the coolant system regardless of engine operation. These components of the vehicle system are connected to each other via several coolant circuits, wherein the heat transport is realized by a coolant circulating in coolant lines of the coolant circuits. In this way, for example, waste heat from the combustion engine can be fed into the interior heating system and the vehicle interior can be heated.

An auxiliary heater is provided in the first coolant circuit of the coolant system. As a rule, the auxiliary heater is passively switched when the combustion engine is activated and then does not provide any heat input into the coolant system.

When the vehicle is deactivated, the auxiliary heater can be activated, especially before the start of the journey. In this case, the auxiliary heater and the interior heater form a closed circuit by means of a corresponding valve shut-off of the shut-off valve in order to introduce the heat generated in the auxiliary heater into the interior of the vehicle in a targeted manner. Thus, the coolant heats up in the closed first coolant circuit, even when the engine system is inactive.

On or after the cold start of the combustion engine, a variety of diagnostics functions usually take place. Since knowledge of the coolant temperature is emission-relevant, a diagnostics function is also required for the coolant temperature sensor. This diagnostics function is carried out, among other things, when the combustion engine is cold-started. As a rule, depending on an ambient temperature and the measured coolant temperature, a determination is made as to whether the coolant temperature sensor is functional.

The heat input from the auxiliary heater can generally cause the cooling system to be warmed up beyond the closed circuit. This leads to heating of the coolant in parts of the coolant system, which can also be detected by the coolant temperature sensor.

Monitoring the functionality of the coolant temperature sensor, which is based on a comparison between the ambient temperature and the temperature reading of the coolant temperature sensor during a cold start, would then possibly display an error.

Since an auxiliary heater operated while the engine system is inactive is not signaled by a corresponding electrical signal in every vehicle system, it is necessary to detect in some other way whether the auxiliary heater was in operation before the engine system was activated. If the diagnostics function is aware of the previous operation of the auxiliary heater, the diagnosis can then be omitted.

To this end, the above method provides that after the engine system is activated, a coolant pump for the second coolant circuit is activated and the coolant system is brought to a state in which the first cooling system circuit of the auxiliary heater and the interior heater is connected to the second coolant circuit of the cooling system. If the auxiliary heater was activated before the engine system was put into operation, heated coolant now flows through the second coolant circuit and thus over the temperature sensor located there. Due to the mixing of the heated coolant from the auxiliary heater with the other coolant of the second coolant circuit, which is usually at a different temperature level, a rapid and, in particular, non-monotonous temperature change occurs even in the event of a cold start after operation of the auxiliary heater due to the starting pump.

In order to be able to better detect an increase in the temperature of the coolant due to the previous operation of the auxiliary heater, it is proposed according to the above method to integrate a gradient of the detected coolant temperature in terms of amount over time. This integration takes place over a fixed period of up to 30 seconds, for example, during which no further significant heat input can occur, e.g., from an electric booster heater in the second coolant circuit or due to waste heat from the operation of the internal combustion engine.

This integration value is compared with a predetermined threshold value in order to obtain a signal when exceeded indicating that the auxiliary heater was activated before the combustion engine was cold started.

Furthermore, the specified threshold value can be fixed or determined depending on an ambient temperature or an engine temperature.

The evaluation of the integration value over time of the amount of the gradient of the measured coolant temperature makes it possible to better detect an increase in coolant temperature despite the fluctuations in the temperature value. As a result, previous operation of the auxiliary heater can be detected more reliably.

In an example, diagnostics of the coolant temperature sensor may only be performed if it is determined that the auxiliary heater was not activated before the cold start.

According to another aspect, an apparatus is provided for carrying out the above method.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
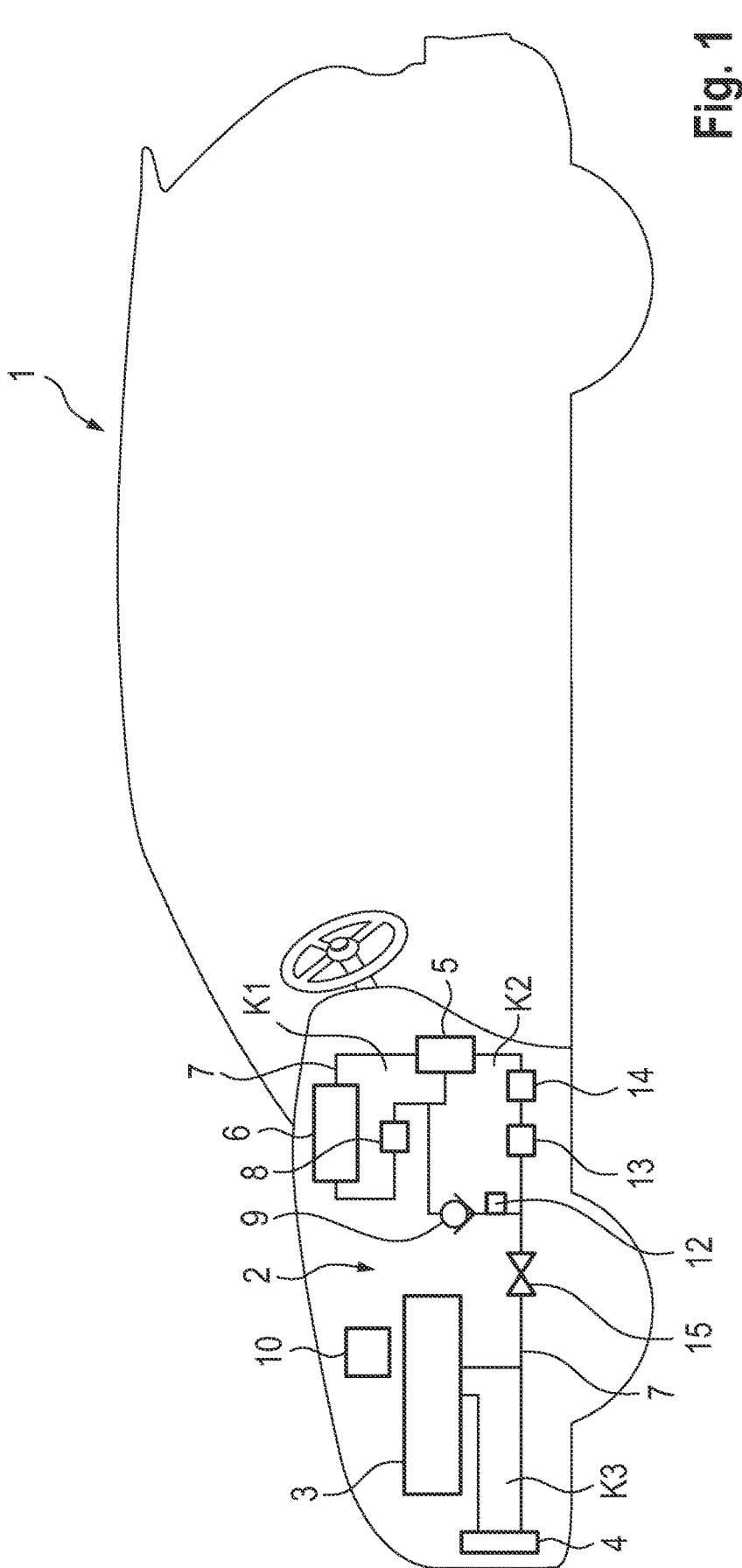
FIG. 1 is a schematic representation of a vehicle system with a coolant system for heat transport in a motor vehicle.

FIG. 1 shows a schematic representation of a vehicle 1 with a cooling system 2 for transporting heat to and from components of the vehicle 1. The vehicle comprises an internal combustion engine 3, a radiator 4, an interior heater 5 (heat exchanger), an auxiliary heater 6 and, if necessary, an electric booster heater 13. The components are connected to each other via coolant lines 7 in closed coolant circuits. A first coolant circuit includes a coolant pump 8 to convey the coolant through the cooling system 2.

A first coolant circuit K1 comprises the auxiliary heater 6, the interior heater 5 and a first coolant pump 8. A second coolant circuit K2 comprises a second coolant pump 14, the booster heater 13 and the interior heater 5. A third coolant circuit K3 comprises the internal combustion engine 3 and the radiator 4.

A first shut-off valve 9 is provided which is designed as a non-return valve in order to form the first coolant circuit K1 as a closed coolant circuit for the coolant between the auxiliary heater 6 and the interior heater 5 when the auxiliary heater 6 is operated when the combustion engine 3 is deactivated. The second coolant circuit K2 and the third coolant circuit K3 are connected to each other via a controllable second shut-off valve 15.

The function of the cooling system 2 is controlled in a familiar way by means of a control unit 10.

After the engine cold start of the combustion engine 3, the second coolant pump 14 is activated by the control unit 10 and thus the first shut-off valve 9 is opened due to the coolant pressure, putting the second coolant circuit K2 into operation. Through the open shut-off valve 9, the second coolant circuit K2 is connected to the first coolant circuit K1.

In addition to the first coolant circuit K1 for the auxiliary heater 6, a coolant temperature sensor 12 is provided in the second coolant circuit K2 to record a temperature reading for the coolant temperature.

Due to legal requirements, it is necessary to regularly check the functionality of the coolant temperature sensor 12, as the correct measurement of the coolant temperature is relevant to emissions.

For this purpose, it is usually provided to make a comparison between the measured coolant temperature and at least one other temperature measured by another temperature sensor in order to diagnose the coolant temperature sensor 12. If, in the case of a previously cooled engine system, the measured coolant temperature and the further temperature are essentially the same, it is assumed that the coolant temperature sensor 12 is functioning properly. If there is a discrepancy, an error can be detected.

However, if the auxiliary heater 6 was active before a cold start of the combustion engine 3, part of the coolant in the cooling system 2 is already heated. Diagnostics that would then take place would result in a fault in the coolant temperature sensor 12 being incorrectly detected. Thus, it is desirable to detect the operation of the auxiliary heater 6 before the cold start of the combustion engine 3.

Figure 2:
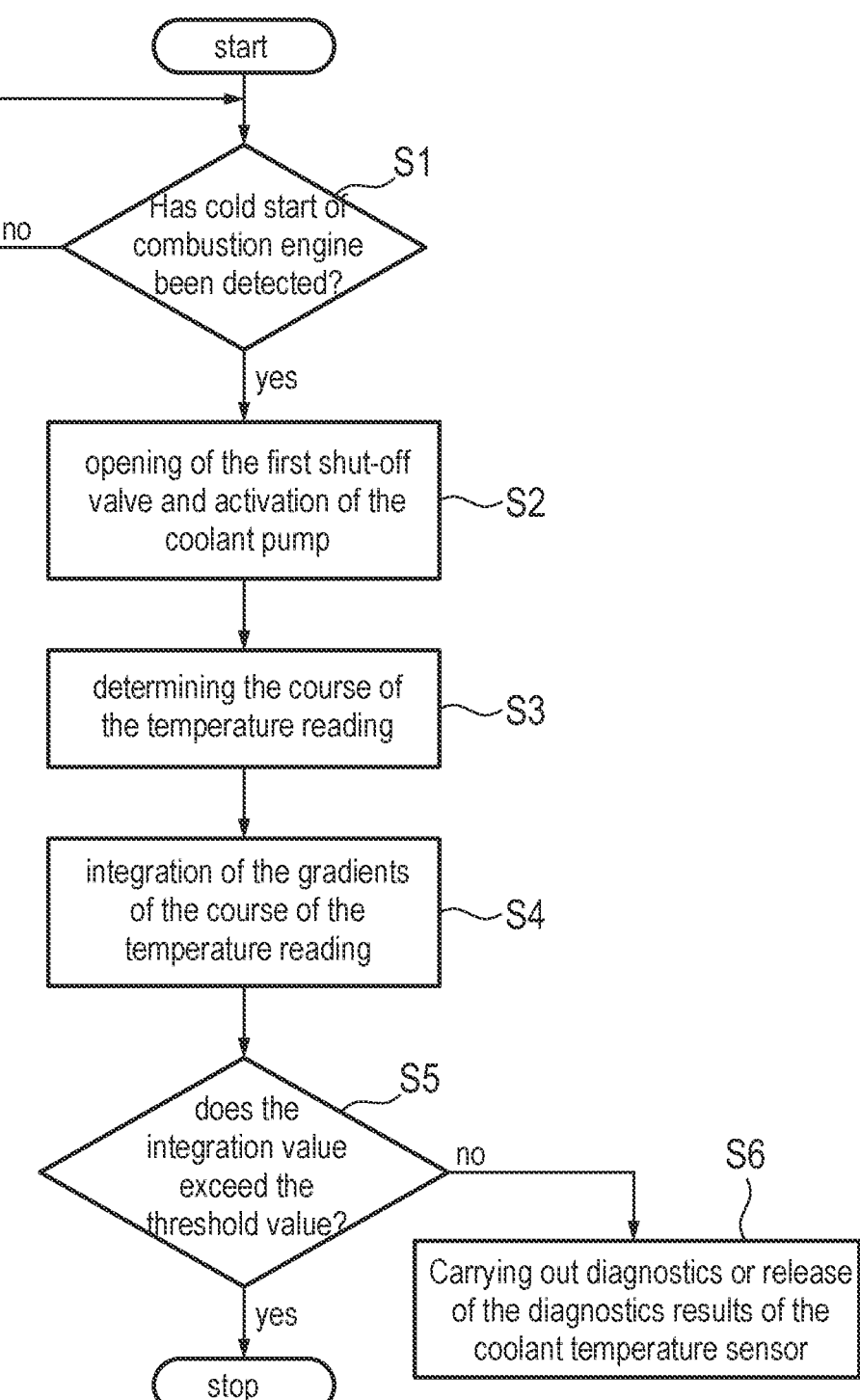
FIG. 2 is a flowchart illustrating a method for detecting an auxiliary heater activated prior to the cold start of an internal combustion engine and for performing a diagnostics function on a coolant temperature sensor.

The diagnostics function for the coolant temperature sensor 12 is carried out in the control unit 10. In the control unit 10, a method is implemented as software and/or hardware, which is described more clearly using the flow diagram of FIG. 2.

In step S1, it is checked whether a cold start of the combustion engine has taken place. A cold start of the combustion engine 3 occurs when the shutdown time of the combustion engine 3 was a certain minimum time ago and there is a signal on the terminal 15, for example. If a cold start of the combustion engine 3 is detected (alternative: yes), the method is continued with step S2, otherwise (alternative: no), the system reverts to step S1.

In step S2, the first shut-off valve 9 is opened and the first coolant pump 8 is activated. In the case of a check valve as a shut-off valve 9, the former is opened by activating the first coolant pump 8. The coolant is now conveyed through the second coolant circuit K2.

The temperature reading measured by the coolant temperature sensor 12 is monitored in step S3 and its history is recorded.

For a predetermined period of time, which begins with the time of the cold start of the combustion engine 3, a time series of gradient values of the temperature reading is determined and temporally integrated in step S4 based on the recorded history of the temperature reading. This leads to an increase in the detectable temperature change, which can be detected immediately after the first coolant pump 8 is activated, so that an increase in the coolant temperature due to previous operation of the auxiliary heater 6 can be reliably detected.

In an example, the amount of the gradient of the courses of the measured coolant temperature can be evaluated. This makes it possible to detect even more accurately an increase in the temperature of the coolant due to the operation of the auxiliary heater. For example, the duration of the integration can be set between 10 and 30 s. The integration makes it possible to reliably detect an increase in the measured coolant temperature immediately after the cold start, which usually occurs at the coolant temperature sensor 12 at an indefinite period of time after the cold start of the combustion engine 3, regardless of the design of the cooling system 2.

Step S5 verifies whether diagnostics of the coolant temperature sensor 12 should be performed. If it is determined that the integration value specified in step S4 exceeds a threshold value (alternative: yes), it is concluded that the auxiliary heater 6 is in operation and the method is terminated without diagnostics. Otherwise (alternative: no), a diagnosis of the coolant temperature sensor 12 is made in step S6 by comparing the coolant temperature reading with an ambient temperature value provided or measured in the control unit 10 in a known manner.

The temperature values for the temperature comparison of the diagnostics are stored before the engine system starts. Subsequently, the diagnostics result is released depending on the review of step S5.

Figure 3:
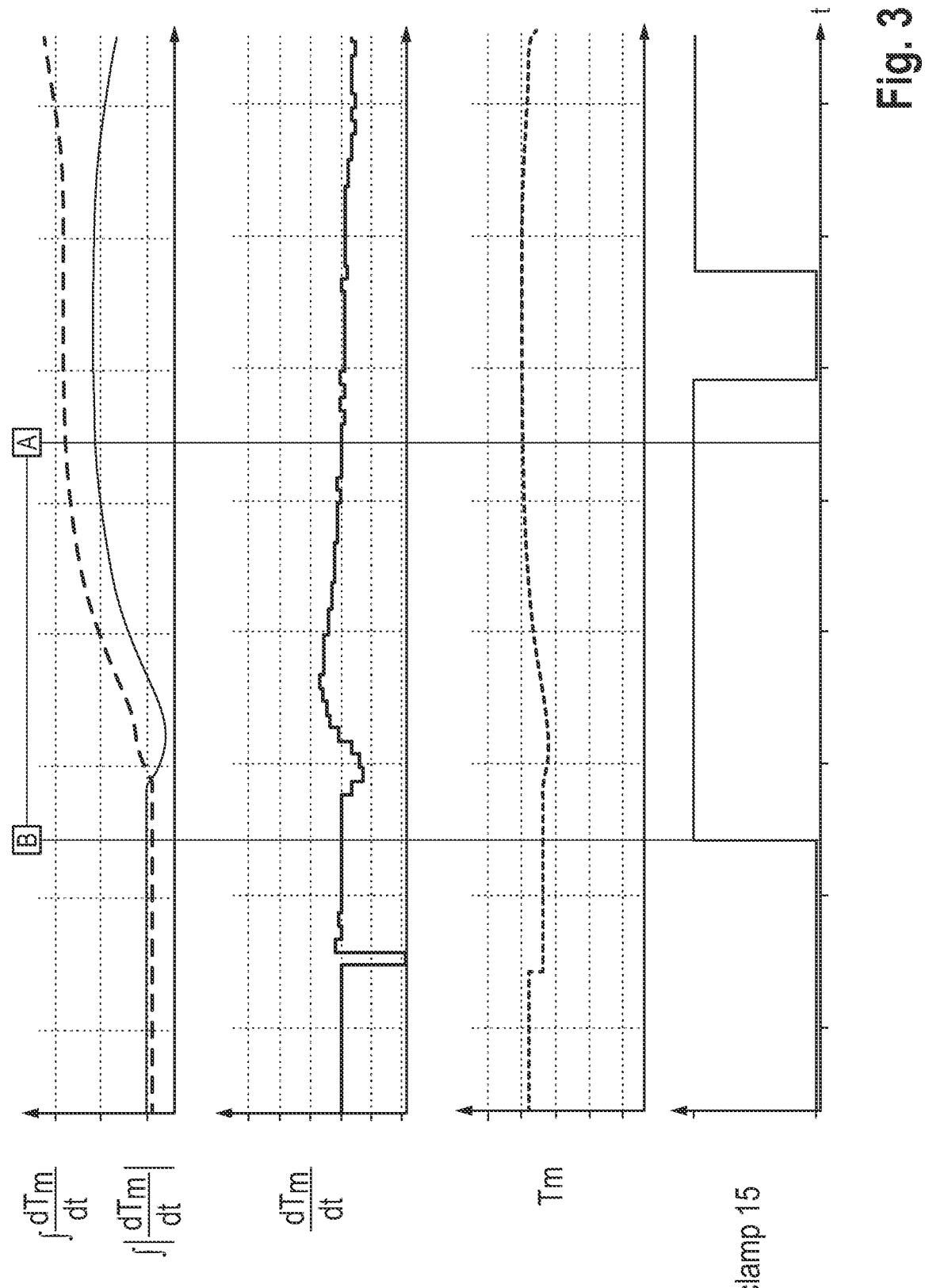
FIG. 3 is a diagram to illustrate the courses of the temperature reading, its gradients, and gradient integration values.

FIG. 3 illustrates the trajectories of a terminal 15 signal, of a temperature reading Tm, of a gradient of the temperature reading $$\frac{dT_m}{dt}$$

and an integration value of the gradient of the temperature reading $$\int \frac{dT_m}{dt}$$

as well as an integration value of the amount of the gradient of the temperature reading $$\int \left| \frac{dT_m}{dt} \right|.$$

It can be seen that the detection accuracy of an increased coolant temperature after a cold start is significantly improved by the integrated gradient as compared to the pure evaluation of the gradient value. A further improvement comes from the integration of the amount of the gradient value.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method to detect an operation of an engine-independent auxiliary heater in a cooling system with multiple coolant circuits in a vehicle system with an auxiliary heater, the method comprising:

opening, on or after activating the vehicle system for a cold start, a shut-off valve between a first coolant circuit with the auxiliary heater and a second coolant circuit with a coolant temperature sensor and activating a coolant pump so that coolant from the first coolant circuit flows about the coolant temperature sensor;

recording a time course of a temperature reading from the coolant temperature sensor for a predetermined period of time from the time the vehicle system is activated;

determining a course of the gradient of the temperature reading; and evaluating the course of the gradient of the temperature reading curve using a threshold value comparison to determine whether the auxiliary heater was activated before the cold start.

2. The method according to claim 1, wherein the threshold value comparison is carried out depending on an integration value of the gradient of the course of the temperature reading.

3. The method according to claim 2, wherein it is determined that the auxiliary heater was activated prior to the cold start when the integration value exceeds a predetermined threshold value.

4. The method according to claim 3, wherein the threshold value is fixed or is determined depending on an ambient temperature.

5. The method according to claim 1, wherein the threshold value comparison is carried out depending on an integration value of an amount of the gradient of the course of the temperature reading.

6. The method according to claim 1, wherein a diagnosis of the coolant temperature sensor is performed or released only if it is found that the auxiliary heater was not activated prior to the cold start.

7. A vehicle system of a vehicle, the system comprising:

a first coolant circuit of a cooling system with an auxiliary heater;

a second coolant circuit of the cooling system with a coolant temperature sensor;

a shut-off valve between the first coolant circuit and the second coolant circuit;

a coolant pump; and a control unit configured to perform the method according to claim 1.

\* \* \* \* \*